United States Patent [19]

Moffett et al.

[11] 4,445,361
[45] May 1, 1984

[54] SYSTEM FOR DETECTION OF TRANSDUCER DEFECTS

[75] Inventors: Mark B. Moffett, Waterford; William L. Konrad, East Lyme, both of Conn.

[73] Assignee: The United States of America as represented by the Secretary of the Navy, Washington, D.C.

[21] Appl. No.: 430,097

[22] Filed: Sep. 30, 1982

[51] Int. Cl.³ ...................... H04B 13/00; H04R 29/00
[52] U.S. Cl. .................................. 73/1 DV; 73/584; 367/13
[58] Field of Search .................. 73/1 DV; 367/13; 73/584, 572

[56] References Cited

U.S. PATENT DOCUMENTS

| | | | |
|---|---|---|---|
| 3,036,289 | 5/1962 | Beebe et al. | 367/13 |
| 3,659,255 | 4/1972 | Trott | 367/13 |
| 3,781,776 | 12/1973 | Kuhn et al. | 367/13 |
| 4,391,124 | 7/1983 | Drost | 73/1 DV |

FOREIGN PATENT DOCUMENTS 911320 3/1982 U.S.S.R. ................. 73/584

Primary Examiner—Howard A. Birmiel
Attorney, Agent, or Firm—Robert F. Beers; Arthur A. McGill; Michael J. McGowan

[57] ABSTRACT

Apparatus and method for nondestructive detection of loose parts or faulty bonds in sound transducers by measuring erratic second-order nonlinear difference-frequency responses of the test transducer to a pulsed high level dual-frequency sound field produced by a high power projector. Such field may be generated by combining a high frequency carrier signal at frequency $f_o$ with a low frequency tone burst signal at frequency $f/2$ in a double balanced modulator so as to produce the dual-frequency pulse at $f_o+f/2$ and $f_o-f/2$. The test transducer converts the dual-frequency pulse into a plurality of linear and nonlinear frequency components including the difference-frequency f. These are then fed through a passive low-pass filter to eliminate the high frequency components, amplified by a pre-amplifier, further filtered by a bandpass filter to eliminate the DC component, leaving only the difference-frequency f which is amplified by a post-amplifier and displayed on a cathode-ray oscilloscope triggered by synchronizing pulses from the tone burst oscillator. Rapid variations in the difference-frequency signal level and phase indicate a loose part or bond.

7 Claims, 2 Drawing Figures

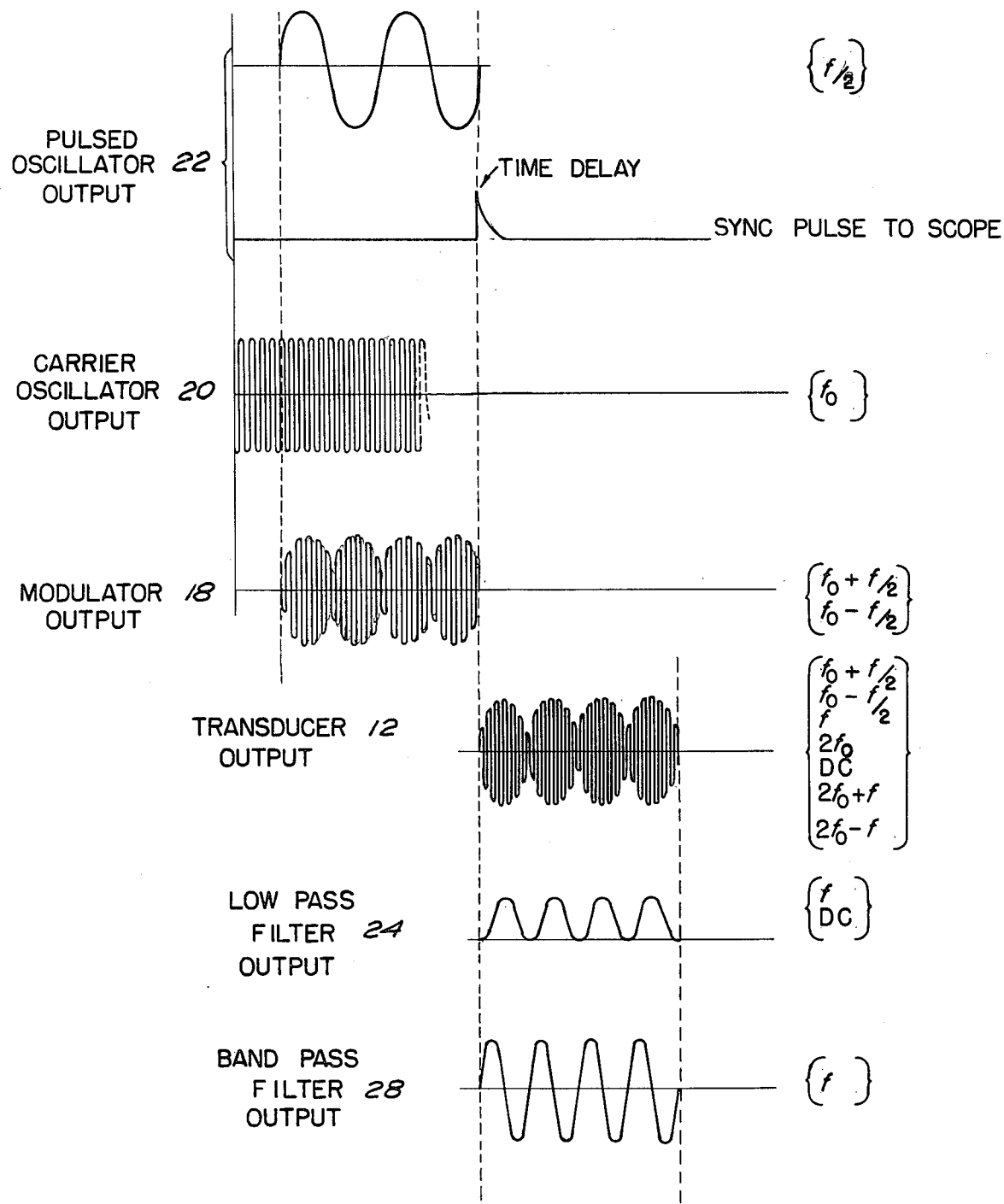
F I G. 2

SYSTEM FOR DETECTION OF TRANSDUCER DEFECTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to nondestructive testing of underwater sound transducers and more particularly to an apparatus and method for disclosing the presence or absence of loose parts and/or faulty bonds in hydrophones by projecting a pulsed dual-frequency sound field and measuring the response of the test transducer for nonlinearities indicated by the presence of an erratic difference-frequency signal.

(2) Description of the Prior Art

Hydrophones are considered to be generally linear devices. This linearity is relied upon when analyzing data received by operational hydrophone arrays or when making many other acoustic test measurements. While slight deviations in linearity can usually be tolerated, manufacturing defects such as loose parts and/or defective boot bonds may introduce significant nonlinearities during system operation or test resulting in erroneous data. Detection of boot bond defects to date has been costly in that production samples must be destructively tested and also has not been totally accurate in that untested units may still be defective. Present nondestructive test methods, such as X-ray inspection and ultrasonic flaw detection, have been unsuccessful in detecting the very thin voids which can occur within a bond. Loose interior parts can be detected by the presence of harmonics in the signal radiated by the transducer, but transducer boot bonds can presently only be checked by costly destructuve methods. What is needed is a relatively inexpensive nondestructive testing system which can be used to inspect all manufactured units for both types of defects.

SUMMARY OF THE INVENTION

Accordingly, it is a general purpose and object of the present invention to provide a test apparatus and method for determining the presence or absence of loose parts and/or faulty bonds in sound transducers. It is a further object that such test apparatus and method be nondestructive to the transducers being tested. Another object is that such test apparatus and method employ projection of a dual-frequency sound field while measuring the transducer response for nonlinearities. A still further object is that the dual-frequency pulse comprise a high frequency carrier signal modulated by a low frequency tone burst signal. These and other objects of the present invention will become apparent when considered in conjunction with the specification and drawings.

These objects are accomplished with the present invention by providing a nondestructive testing apparatus and method for detecting the presence of loose parts or faulty bonds in underwater sound transducers by measuring erratic, second order nonlinear difference-frequency responses by the test transducer to a pulsed, high level, dual-frequency sound field produced by a high power projector. Such sound field is produced by combining a relatively high frequency carrier signal with a relatively low frequency tone burst signal in a double balanced modulator in such a way as to produce a dual-frequency pulse. The nonlinear response of the test transducer gives rise to a difference-frequency f among the transducer output signal, which signal is then fed through a passive low-pass filter to eliminate high frequency signal components, amplified by a preamplifier, further filtered by a bandpass filter to eliminate the DC level, leaving difference-frequency f which is then amplified by a postamplifier and displayed on a cathode-ray oscilloscope triggered by delayed synchronizing pulses from a pulsed tone burst oscillator. If the difference-frequency signal amplitude and phase at the transducer outlet are steady or only slowly varying with time, test transducer performance is acceptable. However, if the level and phase of the signal vary rapidly from one pulse to the next, then a loose part or bond is present in the test transducer.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 2 represents a sequential depiction of a typical signal pulse waveform as it proceeds through and is processed by subject system.

DESCRIPTION OF THE PREFERRED EMBODIMENT

Figure 1:
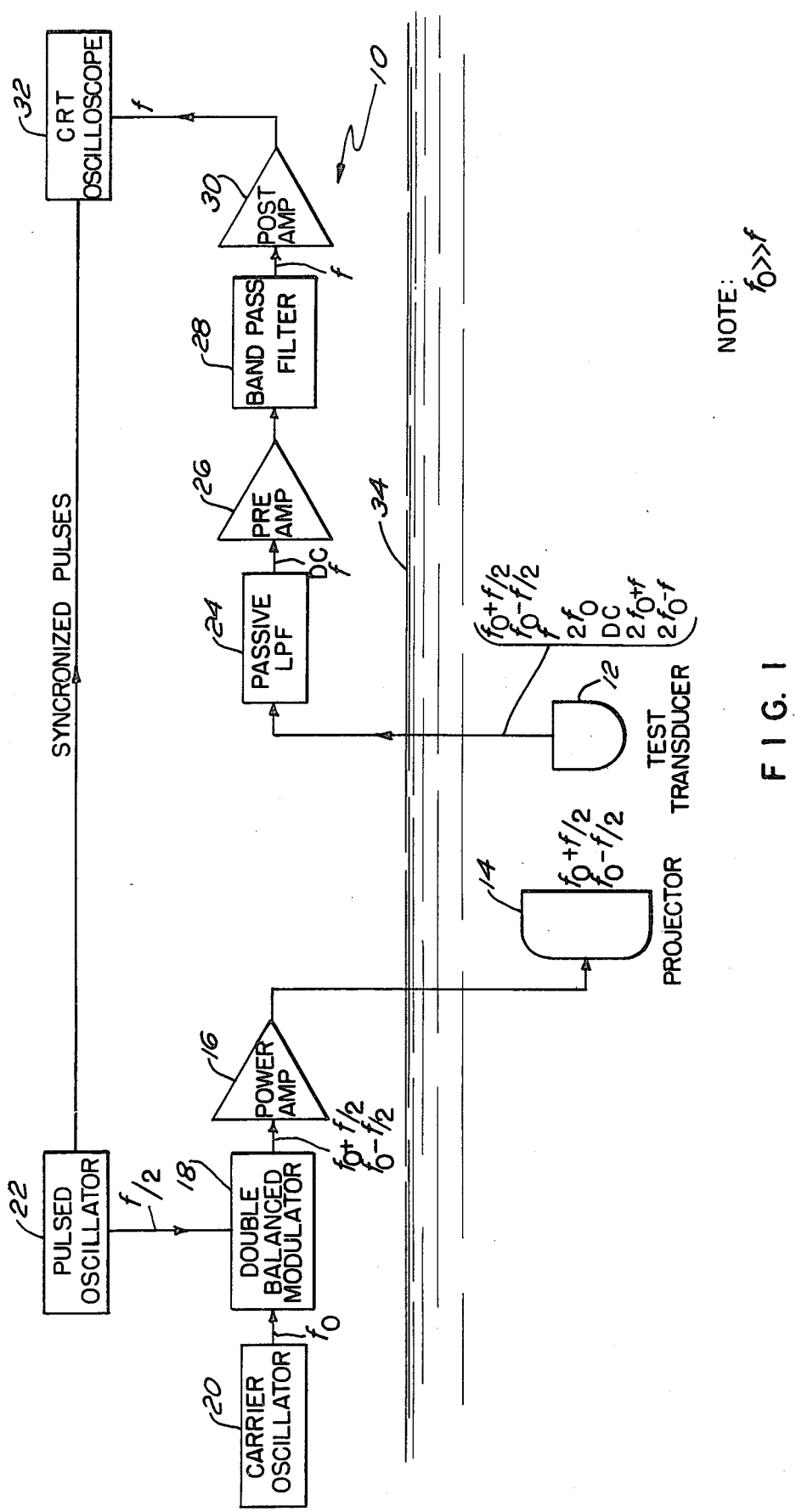
FIG. 1 shows a detail block diagram of a system for detection of transducer defects built according to the teachings of subject invention.

While an acoustic transducer such as a hydrophone is often considered to be a purely linear device, most actually exhibit nonlinear responses also, typically following a square law or the like. The linear aspects of such behavior are generally exploited in constructing operational sonar systems. There are instances however where the nonlinear characteristics of a transducer are crucial, such as in experiments for the purpose of measuring the difference-frequency level in the field of a parametric projector. During the manufacture of these transducers however, loose, unbonded or incompletely bonded parts may occur. A loose or unbonded part presents an impedance which is inherently nonlinear, i.e., hard for motion in one direction, soft for motion in the opposite direction. Therefore, for detecting loose or faulty bonds, nonlinear methods are much more sensitive than linear methods. Specifically, transducers having loose or poorly bonded parts exhibit an erratic second-order nonlinear response to an underwater sound field, even when their first-order linear response is normal.

Referring now to FIG. 1 there is shown a block diagram of an embodiment of a system 10 for detection of transducer defects in accordance with the present invention. Transducer 12, to be tested for flaws, is placed under water and subjected to a high-level dual-frequency sound field produced by a high frequency projector 14. Projector 14 is connected to a power amplifier 16 which is connected to a double balanced modulator 18. Modulator 18 is connected to carrier oscillator 20, and also connected to a pulsed oscillator 22. Carrier oscillator 20 is tuned to a high frequency $f_o$ near the pass band or projector 14. Pulsed oscillator 22 produces a tone burst at a frequency $f/2$ which is much less than $f_o$. Double balanced modulator 18 receives the $f_o$ and $f/2$ signals and produces a dual-frequency pulse, at frequencies $f_o-f/2$ and $f_o+f/2$. The dual-frequency pulse is amplified by power amplifier 16 and radiated into the water medium by projector 14.

Test transducer 12 is positioned in close proximity to projector 14 to overcome certain difficulties associated with propagating high frequencies through water. First, if the separation between the projector and the hydrophone is large, the high frequency carrier $f_o$ will be absorbed by the water. Second, relatively close spacing is necessary to prevent generation of a difference-frequency in the water due to water's inherent nonlinearity. In the instant invention what is desired is that only the inherent nonlinearity of the transducer produce the desired difference-frequency. All other electronics must be linear. Transducer 12 receives the dual-frequency pulse at frequencies $f_o+f/2$ and $f_o-f/2$ and converts the pulse into a signal having linear and nonlinear frequency components, i.e., $f_o+f/2$, $f_o-f/2$, $2f_o$, $2f_o+f$, $2f_o-f$, f and a DC component. The second-order nonlinear response of test transducer 12 is indicated by the presence of a difference-frequency, f, at the transducer output. The output of transducer 12 is fed through a passive low-pass filter 24 connected to transducer 12 to eliminate the frequencies $f_o+f/2$, $f_o-f/2$, $2f_o$, $2f_o+f$ and $2f_o-f$. The DC and f components are next amplified by preamplifier 26 connected to filter 24 and further filtered by bandpass filter 28 connected to preamplifier 26 to remove the DC component. The remaining difference-frequency f is amplified by post-amplifier 30 and displayed on cathode-ray oscilloscope 32 connected to post-amplifier 30 and pulsed oscillator 22 where oscilloscope 32 is triggered by synchronizing pulses from pulsed oscillator 22. When the difference-frequency signal amplitude and phase are steady or only slowly-varying with time, test transducer 12 is regarded as normal. However, when the level and phase of the signal vary rapidly from one pulse to the next a loose part or bond is present in test transducer 12.

FIG. 2 shows typical waveforms at sequential stages throughout the system. It shall be noted that a high downshift ratio $f_o/f$ is desirable to ensure negligible parametric generation, e.g., $f_o=60$ kHz, $f=600$ Hz and $f/2=300$ Hz would yield a 100:1 ratio, with $f_o+f/2$ and $f_o-f/2$ equal to 60.3 kHz and 59.7 kHz respectively. While these two frequencies may be mixed directly instead of using double balanced modulator 18 for combining a high and a low frequency signal, the likelihood of difference-frequency drift would be increased. Also note that the carrier $f_o$ and the half-difference-frequency pulse $f/2$ are shown graphically as relatively low and high frequency waveforms respectively for ease of depiction; however, the actual waveform for high frequency carrier $f_o$ is much higher in frequency relative to the low frequency pulse than is shown in FIG. 2. The synchronizing pulse transmitted from pulsed oscillator 22 to oscilloscope 32 is appropriately time-delayed to allow for signal propagation through the water. The output of modulator 18 represents the dual-frequency pulse at $f_o+f/2$ and $f_o-f/2$. Nearly the same pulse waveform appears at the output of transducer 12 but it now contains the difference-frequency f along with the projected frequencies, harmonics thereof and DC component. After filtering out all high frequency components only the difference-frequency f and a DC component appear in the output of low-pass filter 24. Bandpass filter 28 next removes the DC level, allowing only the difference-frequency f to be displayed to oscilloscope 32. In operation multiple pulses are transmitted and the difference-frequency waveform is compared from pulse to pulse. Erratic nonlinear effects caused by any loose part or incomplete bond will cause the f waveform to vary rapidly.

The advantages of this invention over the destructuve techniques currently used are: (1) lower cost, because acceptable transducers do not have to be scrapped or rebuilt after testing; (2) all transducers can be tested, rather than just a sample of production transducers; and (3) much higher testing rate.

What has thus been described is a nondestructive testing apparatus and method for detecting loose parts or faulty bonds in transducers such as hydrophones by measurement of erratic, second-order nonlinear difference-frequency response by the test transducer to a pulsed, high level, dual-frequency sound field produced by a closely spaced high power projector. This sound field is produced by combining a relatively high frequency carrier with a relatively low frequency pulse in a double balanced modulator so as to produce a dual-frequency pulse at $f_o+f/2$ and $f_o-f/2$. The nonlinear response of the test transducer produces a difference-frequency f at the output of the transducer which is then fed through a passive low-pass filter to eliminate high frequencies, amplified by a preamplifier, further filtered by a bandpass filter, amplified by a postamplifier and displayed on a cathode-ray oscilloscope which is triggered by delayed synchronizing pulses from a pulsed tone burst oscillator. If the difference-frequency signal amplitude and phase at the transducer outlet are steady or shift only slowly over time, the transducer is acceptable. However, if the level and phase of the signal vary rapidly from one pulse to the next, then a loose part or bond is suspected to be present in the test transducer.

Obviously many modifications and variations of the present invention may become apparent in light of the above teachings. For example, this invention is also applicable to transducers for use in other media, such as air, i.e., microphone and loud speaker loose parts can be detected by measuring an erratic difference-frequency response to a pulsed two-frequency sound field. Other means of displaying the pulse-to-pulse variation of the output may be employed for production-line testing, e.g., an alarm that sounds when the pulse-to-pulse variation in level is more than 3 dB.

In light of the above, it is therefore understood that within the scope of the appended claims, the invention may be practiced otherwise than as specifically described.

What is claimed is:

1. An apparatus for detecting defects in transducers under test, comprising:

frequency generating means for producing a synchronizing pulse and a dual-frequency signal at frequencies $f_o+f/2$ and $f_o-f/2$ where $f_o>>f/2$;

a projector, submerged in water and connected to said frequency generating means, for receiving said dual-frequency signal from said frequency generating means and projecting said dual-frequency signal a short distance through the water to said test transducer, said test transducer thereafter producing output frequencies $f_o+f/2$, $f_o-f/2$, $2f_o$, $2f_o+f$, $2f_o-f$, f, and a DC component in response thereto;

a linear, difference-frequency filtering means for receiving said output frequencies from said test transducer and producing as the output thereof only difference-frequency f; and display means, connected to said difference-frequency filtering means and said frequency generating means, for receiving said difference-frequency f from said difference-frequency filtering means and said synchronizing pulse from said frequency generating means, and displaying said difference-frequency f thereon thus permitting observation and measurement of signal characteristics.

2. An apparatus for detecting defects in transducers under test according to claim 1 wherein said frequency generating means further comprises:

a high frequency oscillator for producing a high frequency carrier signal at frequency $f_o$;

a low frequency oscillator for producing a pulsed, low frequency, half-difference-frequency signal, at frequency f/2 and said synchronizing pulse;

a double balanced modulator, connected to said high frequency oscillator and said low frequency oscillator, for receiving and combining said high frequency carrier signal at $f_o$ and said low frequency, half-difference-frequency signal at f/2 so as to produce said dual-frequency signal at $f_o+f/2$ and $f_o-f/2$; and a power amplifier, connected to said double balanced modulator for receiving and amplifying said dual-frequency signal from said double balanced modulator.

3. An apparatus for detecting defects in transducers under test according to claim 2 wherein said linear difference-frequency filtering means further comprises:

a passive linear low-pass filter, connected to said test transducer, for receiving said test transducer output frequencies and transmitting only said difference-frequency f and said DC component as the output thereof;

a linear preamplifier, connected to said low-pass filter, for receiving said low-pass filter output and boosting the levels of said difference-frequency f and said DC component;

a linear bandpass filter, connected to said preamplifier, for receiving said difference-frequency f and said DC component from said preamplifier and transmitting only said difference-frequency f as the output thereof; and a linear post-amplifier, connected to said bandpass filter for receiving said difference-frequency f and boosting the level thereof.

4. An apparatus for detecting defects in transducers under test according to claim 3 wherein said display means further comprises an oscilloscope.

5. A method for detecting defects in transducers under test, comprising the steps of:

generating a synchronizing pulse and a dual-frequency signal at frequencies $f_o+f/2$ and $f_o-f/2$, where $f_o>>f/2$;

projecting said dual-frequency signal into a water medium using a high power projector;

receiving said projected dual-frequency signal at said test transducer which is positioned in close proximity to said high power projector, said test transducer producing output frequencies $f_o+f/2$, $f_o-f/2$, $2f_o$, $2f_o+f$, $2f_o-f$, f and a DC component from said dual-frequency signal;

filtering said test transducer output frequencies in such a way as to produce only difference-frequency signal f therefrom; and displaying said difference-frequency signal f upon receipt of said synchronizing pulse to permit measurement of signal characteristics.

6. A method for detecting defects in transducers under test according to claim 5 wherein said generating step further comprises:

producing a high frequency carrier signal at frequency $f_o$;

producing a pulsed, low frequency, half-difference-frequency signal, at frequency f/2 and said synchronizing pulse;

combining said high frequency carrier signal $f_o$ and said low frequency, half-difference-frequency signal at f/2 in such a way as to produce said dual-frequency signal at $f_o+f/2$ and $f_o-f/2$; and amplifying said dual-frequency signal to permit said projecting thereof.

7. A method for detecting defects in transducers under test according to claim 6 wherein said filtering step further comprises:

filtering said test transducer output frequencies to remove high frequency $f_o$ components such that only said difference-frequency f and said DC component remain;

amplifying said filtered output to boost the levels of said difference-frequency f and said DC component;

filtering said difference-frequency f and said DC component to remove said DC component such that only said difference-frequency f remains; and amplifying said difference-frequency f to boost the level thereof.

* * * * *